US012697740B2

(12) United States Patent
Koo et al.

(10) Patent No.: US 12,697,740 B2
(45) Date of Patent: Aug. 4, 2026

(54) SOFT PNEUMATIC MODULE AND SOFT PNEUMATIC GRIPPER

(71) Applicant: RESEARCH & BUSINESS FOUNDATION SUNGKYUNKWAN UNIVERSITY, Suwon-si (KR)

(72) Inventors: Ja Choon Koo, Suwon-si (KR); Yeo Il Yun, Suwon-si (KR); Eun Jeong Song, Suwon-si (KR); Seon Il Lee, Suwon-si (KR); Seung Ho Lee, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 1127 days.

(21) Appl. No.: 17/737,181

(22) Filed: May 5, 2022

(65) Prior Publication Data

US 2023/0015585 A1    Jan. 19, 2023

(30) Foreign Application Priority Data

Jul. 15, 2021    (KR) ........................ 10-2021-0093148

(51) Int. Cl.
*B25J 15/00* (2006.01)
*B25J 9/14* (2006.01)

(52) U.S. Cl.
CPC ........... *B25J 15/0023* (2013.01); *B25J 9/142* (2013.01)

(58) Field of Classification Search
CPC .... B25J 15/0023; B25J 9/142; F15B 15/1404; F15B 15/103
See application file for complete search history.

(56) References Cited

U.S. PATENT DOCUMENTS

| | | | | |
|---|---|---|---|---|
| 4,629,641 A | * | 12/1986 | Paullin ..................... | F16J 3/042 |
| | | | | 428/184 |
| 5,697,285 A | * | 12/1997 | Nappi ..................... | A61B 34/70 |
| | | | | 92/48 |
| 9,765,909 B2 | * | 9/2017 | Ashcroft ................ | B32B 27/08 |
| 2017/0282360 A1 | * | 10/2017 | Telleria ..................... | F16J 3/04 |

FOREIGN PATENT DOCUMENTS

| | | | | | |
|---|---|---|---|---|---|
| EP | 3529011 B1 | * | 11/2020 | .............. | F15B 15/06 |
| KR | 10-2014-0126407 A | | 10/2014 | | |
| KR | 10-2017-0130144 A | | 11/2017 | | |
| KR | 10-2021-0085040 A | | 7/2021 | | |
| KR | 102346183 B1 | * | 12/2021 | .............. | F15B 11/06 |

* cited by examiner

*Primary Examiner* — Stephen A Vu

(74) *Attorney, Agent, or Firm* — NSIP Law

(57) ABSTRACT

A soft pneumatic module includes a first frame defining a first path portion, a second frame opposite to the first frame and defining a second path portion, a retainer connected to the first frame and the second frame, a plurality of first crease parts disposed along a circumference of the first frame at two sides of the retainer and obliquely disposed inward from the first frame, and a plurality of second crease parts connected to the plurality of first crease parts and the second frame, disposed along a circumference of the second frame at the two sides of the retainer, and expanded along with the plurality of first crease parts as a fluid is injected into the soft pneumatic module.

12 Claims, 22 Drawing Sheets

SOFT PNEUMATIC MODULE AND SOFT PNEUMATIC GRIPPER

CROSS-REFERENCE TO RELATED APPLICATION

This application claims the benefit under 35 U.S.C. § 119(a) of Korean Patent Application No. 10-2021-0093148, filed on Jul. 15, 2021 in the Korean Intellectual Property Office, the entire disclosure of which is incorporated herein by reference for all purposes.

BACKGROUND

Technical Field

The following description relates to a soft pneumatic module and a soft pneumatic gripper, and more specifically, to a soft pneumatic module which minimizes product damage, is largely bent and deformed even with a small size, and has various driven or bent shapes according to an assembly type, and a soft pneumatic gripper.

Discussion of the Background

In the field of agriculture, the food industry, and the like, soft grippers have been used for automation of sorting and transfer operations. As a pneumatic pressure is supplied to a soft gripper, the soft gripper is bent to restrict a product. The soft gripper is manufactured of a soft and flexible material in order to minimize product damage and perform various operations.

However, conventional soft grippers are not easily bent in desired directions. In order for a soft gripper to be bent in a desired direction, a bellows structure is attached to one side of the soft gripper, or a deformation restriction element such as a wire is installed. In such a soft gripper, stress concentration is inevitable due to irregular deformation, and there is a problem in that systematic design specifications suitable for the purpose of use are insufficient.

In addition, when the deformation restriction element is added, there are problems in that the soft gripper is difficult to manufacture, and control is difficult because an expanding shape is not consistent.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a soft pneumatic module includes a first frame defining a first path portion, a second frame opposite to the first frame and defining a second path portion, a retainer connected to the first frame and the second frame, a plurality of first crease parts disposed along a circumference of the first frame at two sides of the retainer and obliquely disposed inward from the first frame, and a plurality of second crease parts connected to the plurality of first crease parts and the second frame, disposed along a circumference of the second frame at the two sides of the retainer, and configured to expand along with the plurality of first crease parts as a fluid is injected into the soft pneumatic module.

Each of the first crease parts may be connected to a respective one of the second crease parts in a one-to-one manner.

Each of the first crease parts and the second crease parts may converge inward toward the retainer from the first frame and the second frame.

The first crease parts and the second crease parts may be obliquely disposed in an opposite direction of the retainer.

As a distance from the retainer increases, a length of each of the first crease parts and a length of each of the second crease parts may increase.

A first crease part disposed farthest from the retainer and a second crease part disposed farthest from the retainer may be connected to each other in a cross shape.

In another general aspect, a soft pneumatic gripper includes two or more soft pneumatic modules connected in series and a coupling module that couples two sides of the soft pneumatic modules. Each of the soft pneumatic modules includes a first frame defining a first path portion, a second frame opposite to the first frame and defining a second path portion, a retainer connected to the first frame and the second frame, a plurality of first crease parts disposed along a circumference of the first frame at two sides of the retainer and obliquely disposed inward from the first frame, and a plurality of second crease parts connected to the plurality of first crease parts and the second frame, disposed along a circumference of the second frame at the two sides of the retainer, and configured to expand along with the plurality of first crease parts as a fluid is injected into the soft pneumatic module, and the coupling module includes a first clamp that passes through an adjacent first frame and an adjacent second frame and restricts the first frame and a second clamp coupled to the first clamp to restrict the second frame.

The first clamp may include a first pressure ring part pressing the first frame and a first coupling pipe part connected to the first pressure ring part to pass through the first frame and the second frame and on which a first screw part is disposed to be screw-coupled to the second clamp.

When the soft pneumatic modules are connected in series, bending deformation directions of the soft pneumatic modules may be changed by changing positions of the respective retainers in a circumferential direction.

For each of the soft pneumatic modules, each of the first crease parts may be connected to a respective one of the second crease parts in a one-to-one manner.

For each of the soft pneumatic modules, each of the first crease parts and the second crease parts may converge inward toward the retainer from the first frame and the second frame.

For each of the soft pneumatic modules, the first crease parts and the second crease parts may be obliquely disposed in an opposite direction of the retainer.

For each of the soft pneumatic modules, as a distance from the retainer increases, a length of each of the first crease parts and a length of each of the second crease parts may increase.

For each of the soft pneumatic modules, a first crease part disposed farthest from the retainer and a second crease part disposed farthest from the retainer may be connected to each other in a cross shape.

Other features and aspects will be apparent from the following detailed description, the drawings, and the claims.

3

Figure 2:
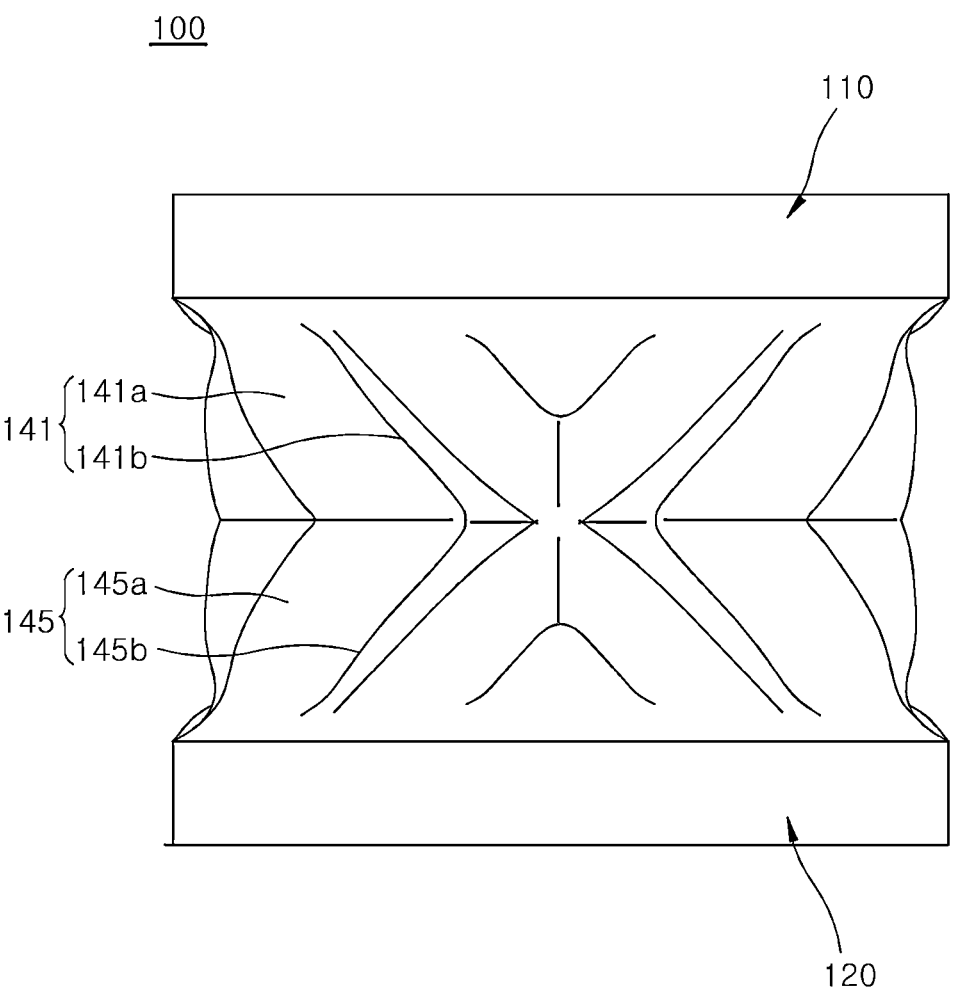

FIG. 2 is a front view illustrating the soft pneumatic module according to an example.

Figure 3:
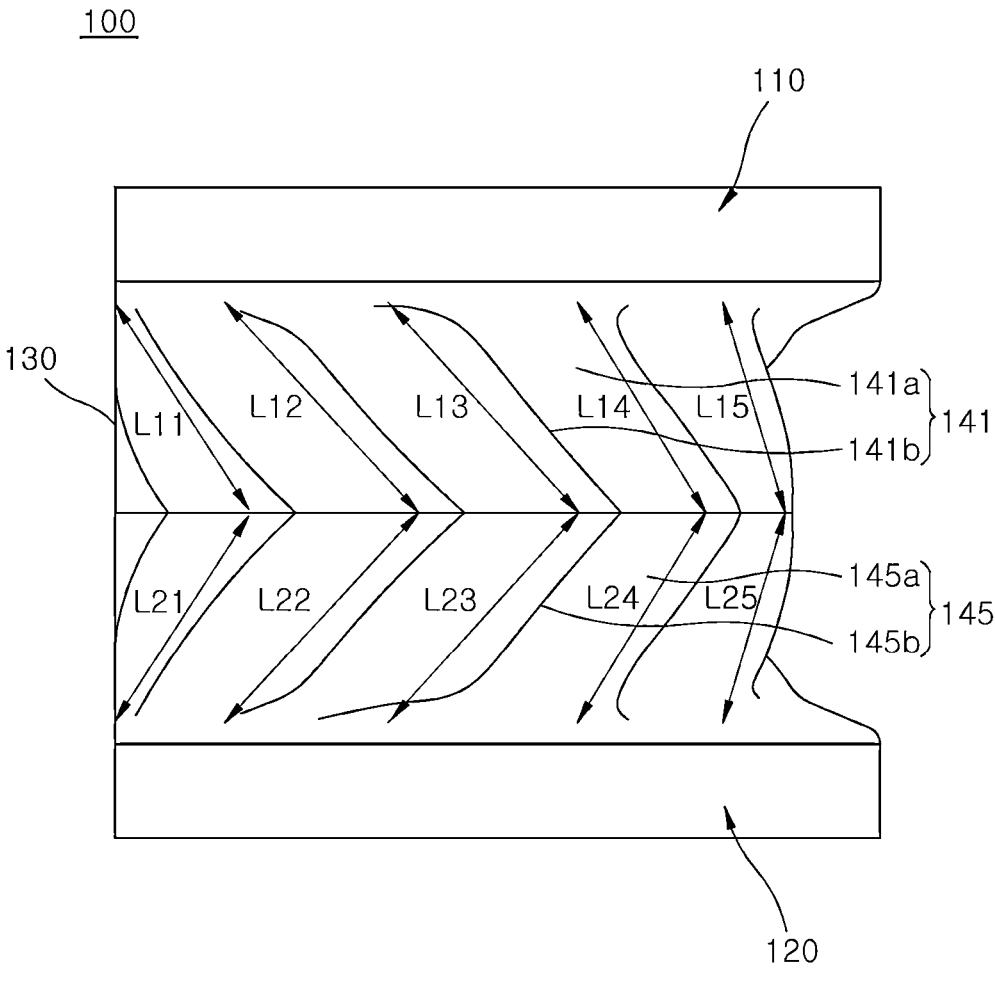

FIG. 3 is a side view illustrating the soft pneumatic module according to an example.

Figure 4:
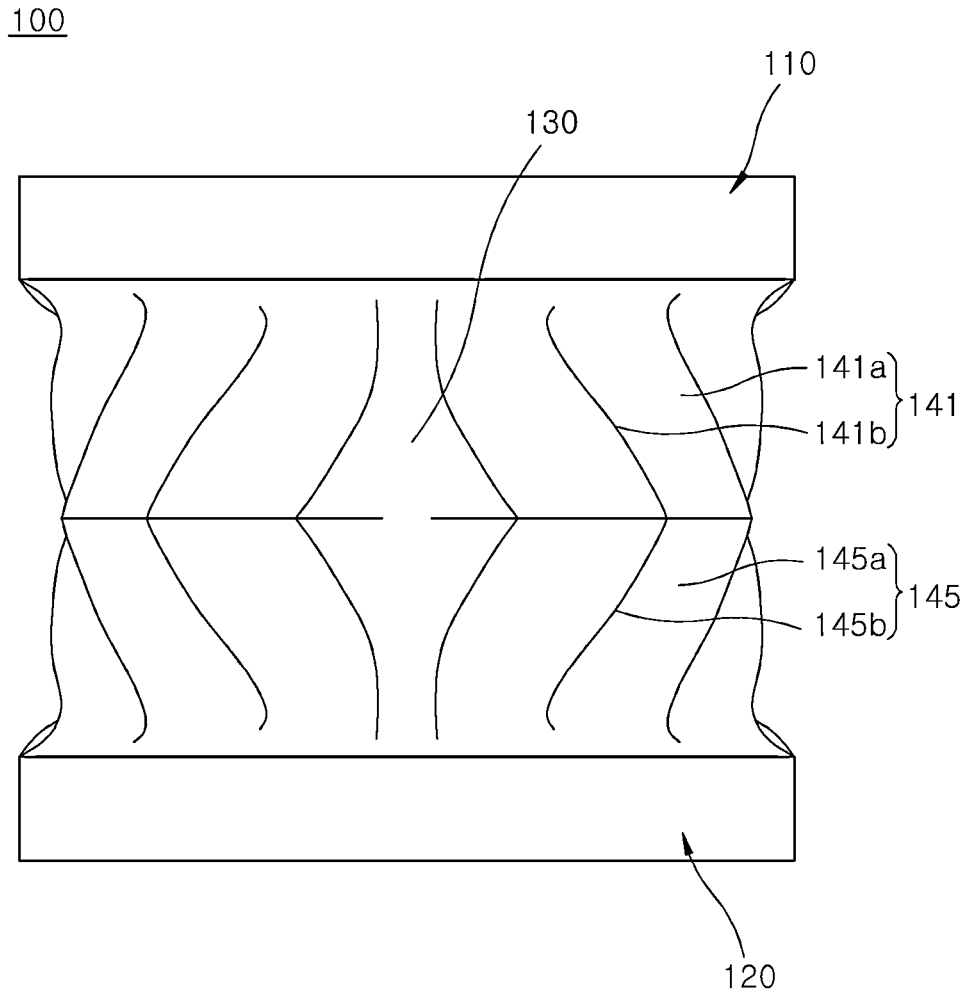

FIG. 4 is a rear view illustrating the soft pneumatic module according to an example.

Figure 5:
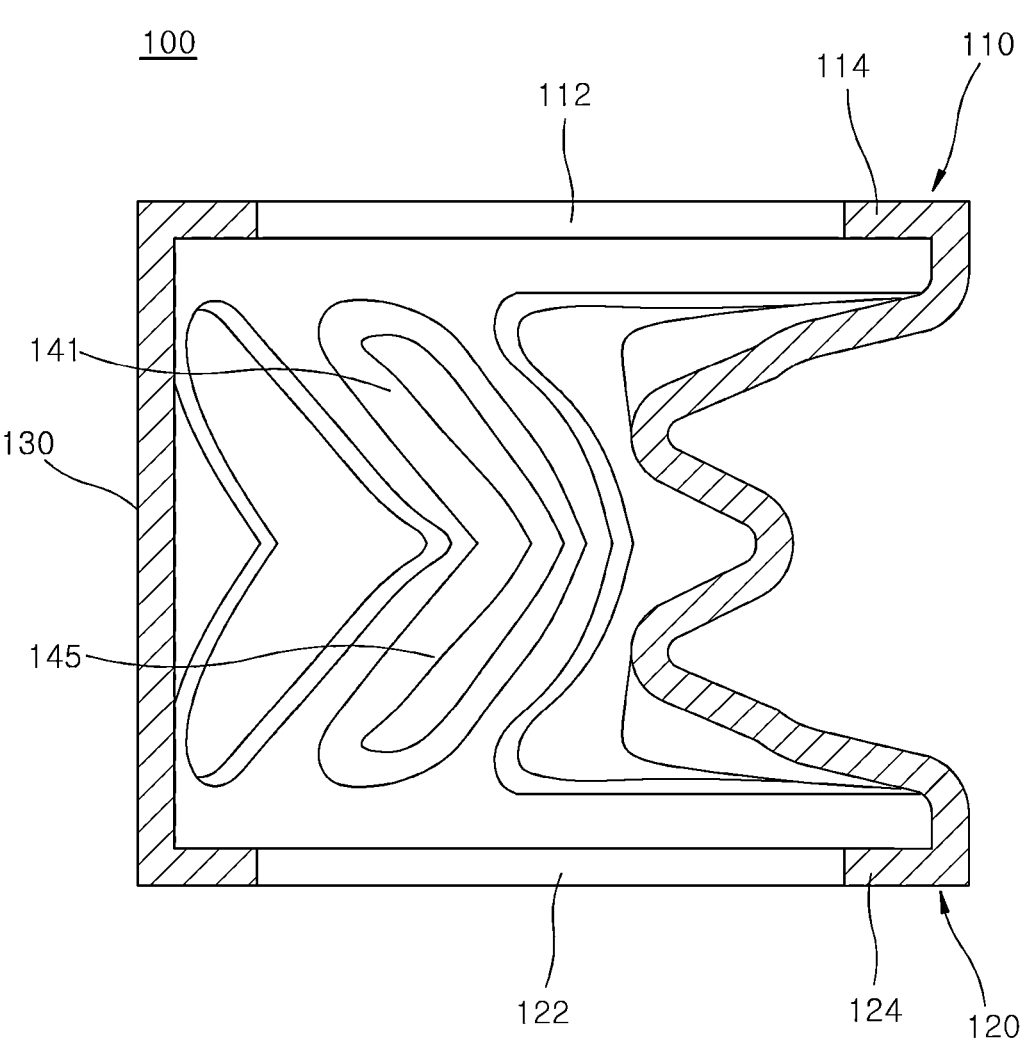

FIG. 5 is a cross-sectional view illustrating the soft pneumatic module according to an example.

Figure 6:
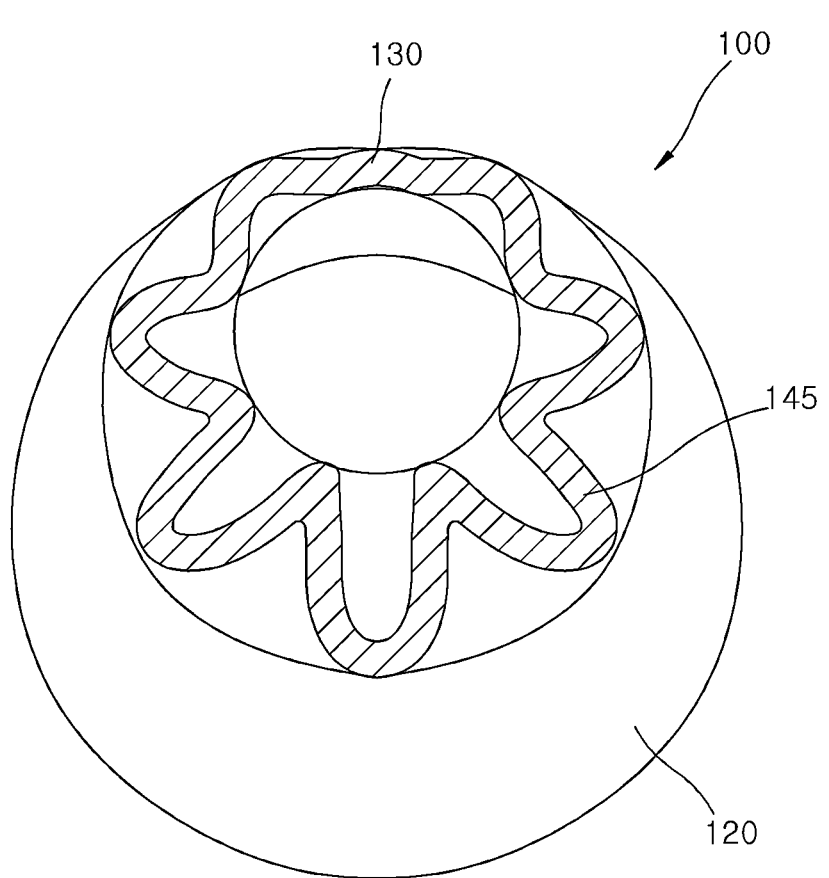

FIG. 6 is a cross-sectional view illustrating a central portion of the soft pneumatic module cut in an axial direction according to an example.

Figure 7:
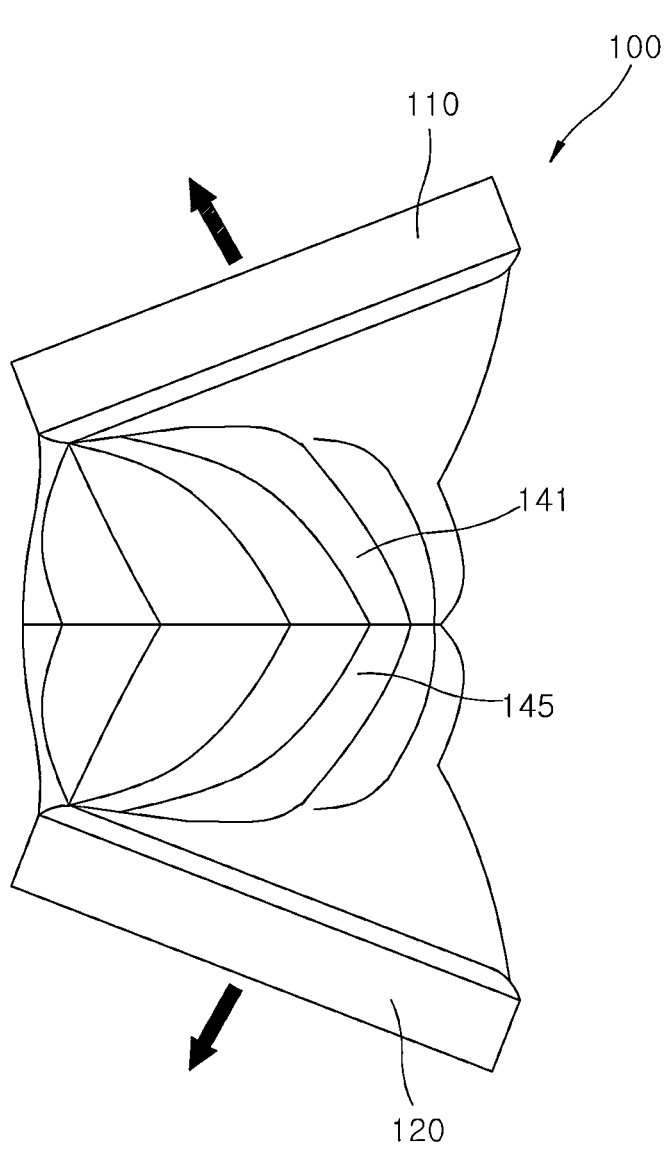

FIG. 7 is a side view illustrating a state in which the soft pneumatic module is bent and deformed when air is injected into the soft pneumatic module according to an example.

Figure 8A:
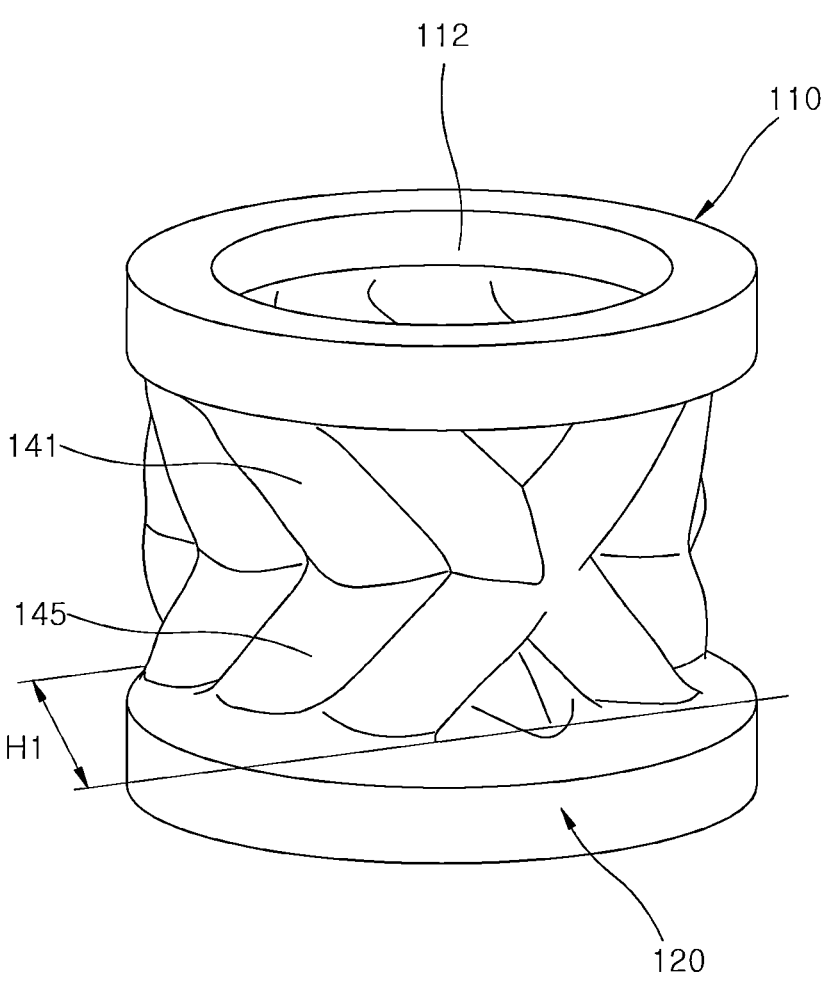
Figure 8B:
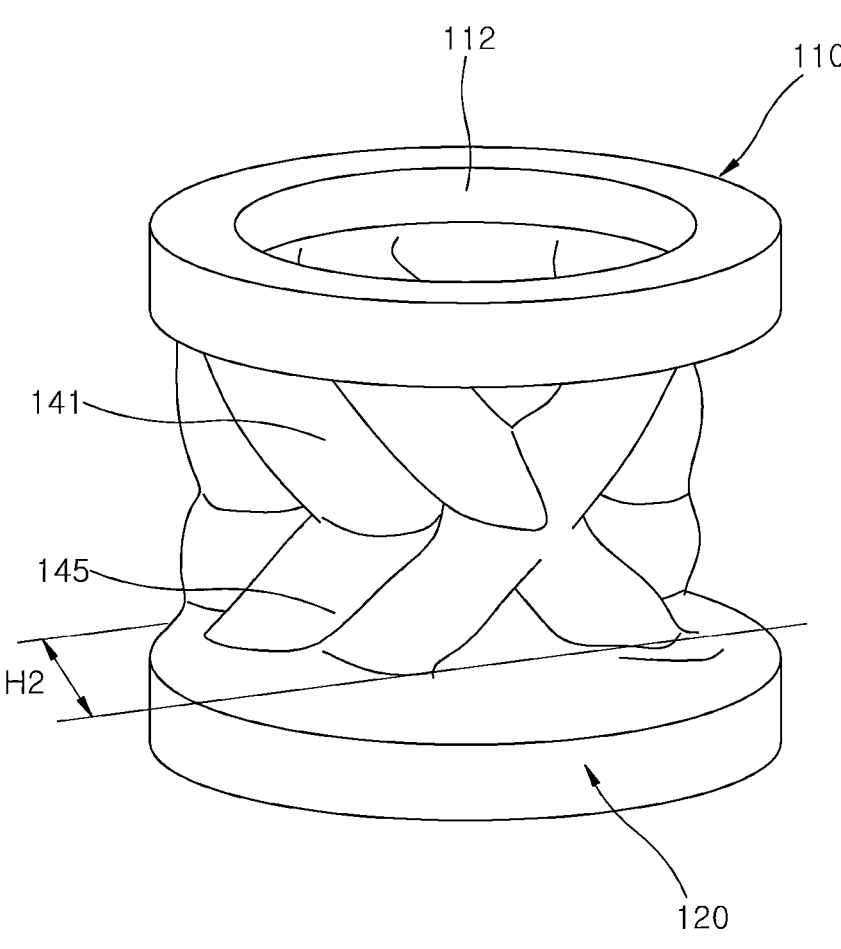
Figure 8C:
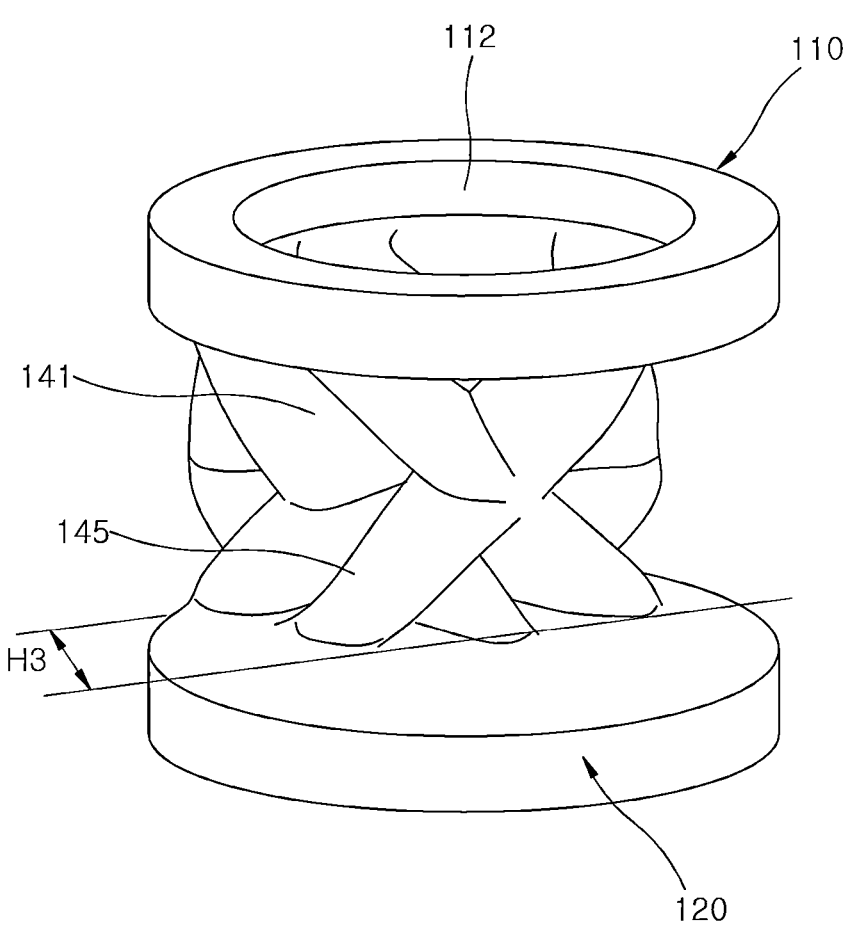

FIGS. 8A, 8B, and 8C are a set of views illustrating an example of adjusting an amount of bending deformation of the soft pneumatic module by changing a position of a first crease part and a position of a second crease part which are spaced farthest from a retainer of the soft pneumatic module according to an example.

Figure 9:
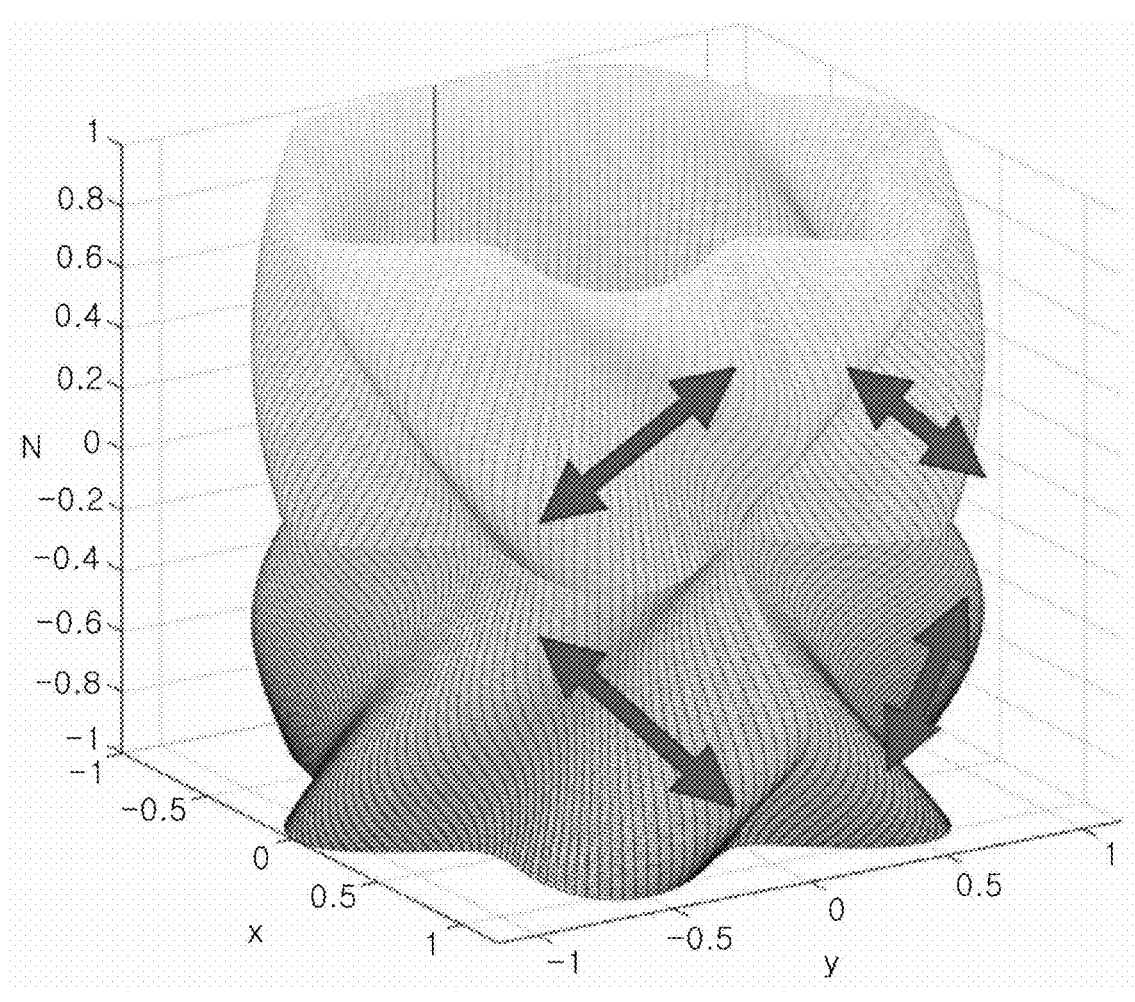

FIG. 9 is a view illustrating a state in which a pressure of a sinusoidal wave spreads from the first crease part and the second crease part in the soft pneumatic module according to an example.

Figure 10:
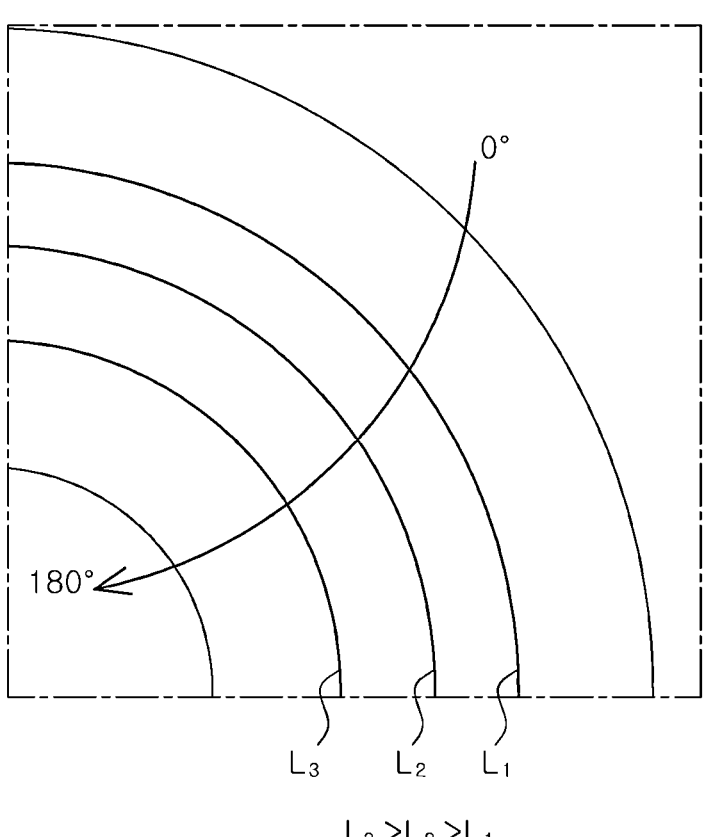

FIG. 10 is a view illustrating a wall surface drawn using a cylindrical coordinate system in the soft pneumatic module according to an example.

Figure 11A:
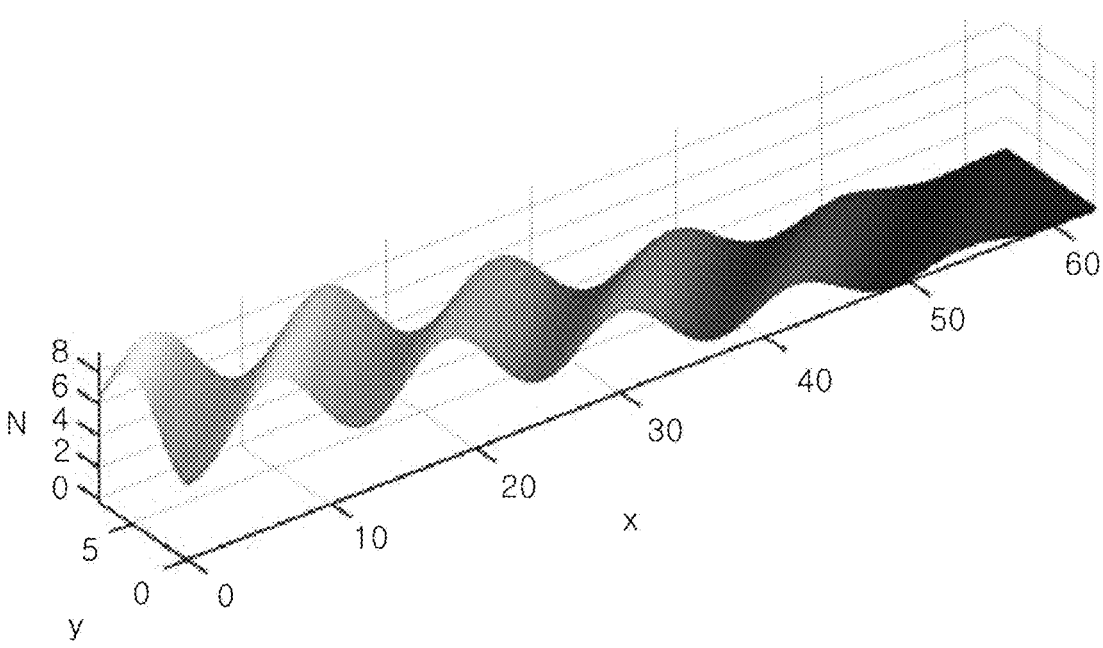
Figure 11B:
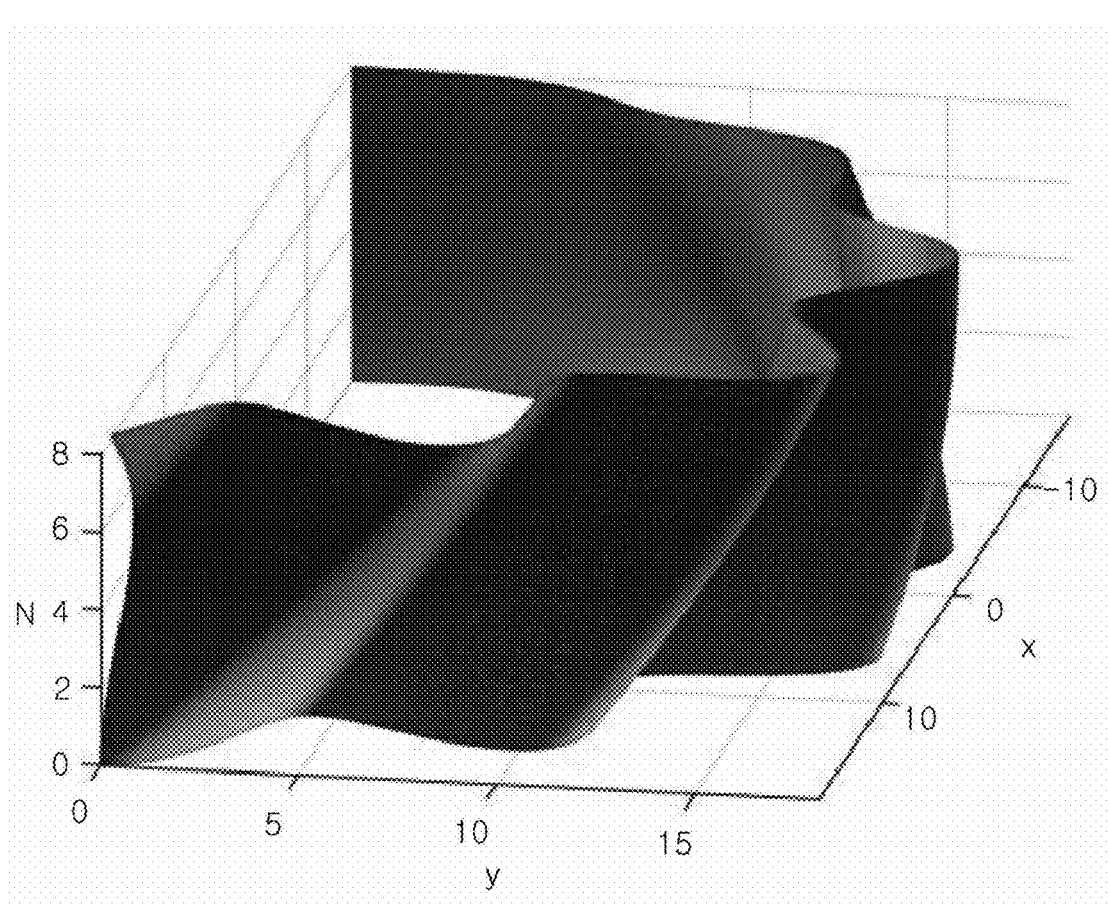

FIGS. 11A and 11B are a set of views illustrating sine curves for forming the first crease parts and the second crease parts in the soft pneumatic module according to an example.

Figure 12A:
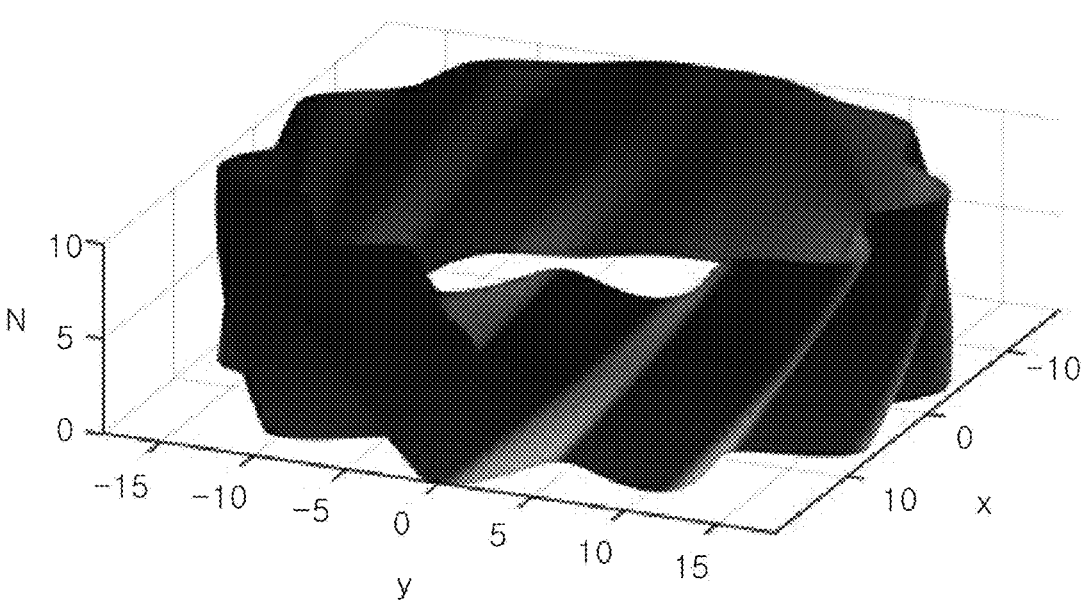
Figure 12B:
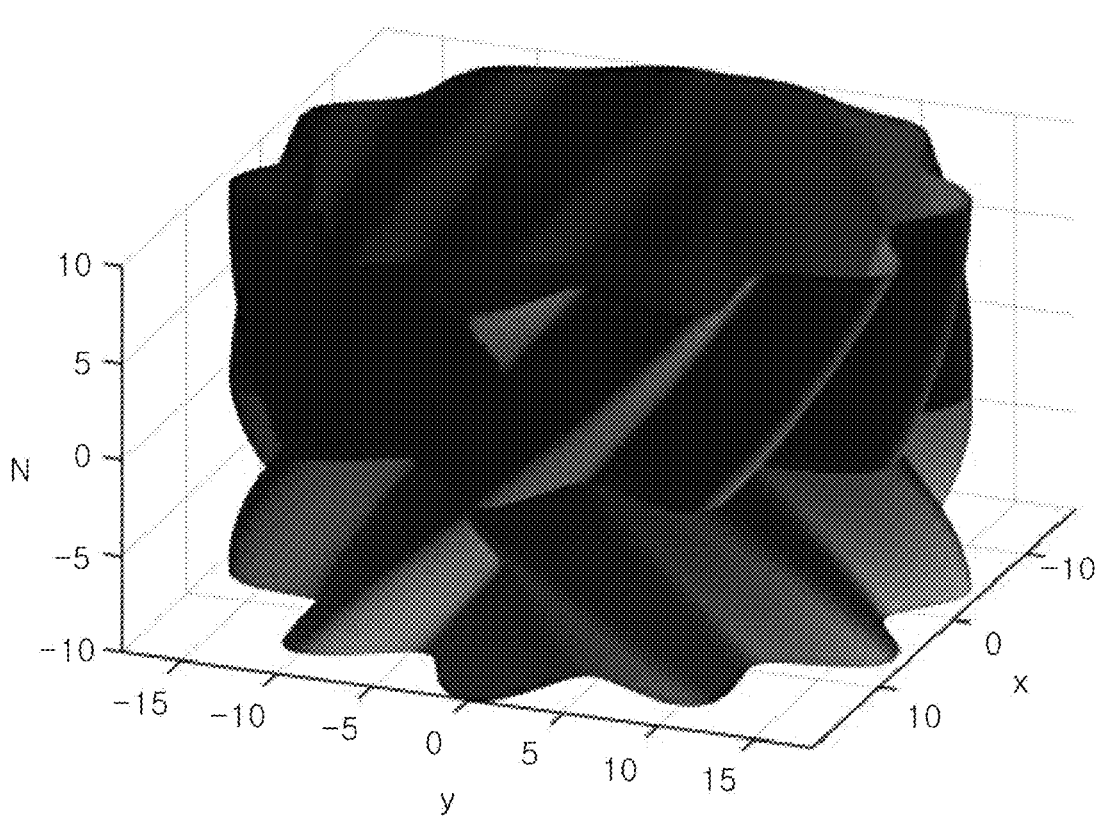

FIGS. 12A and 12B are a set of views illustrating a state in which curved surfaces are symmetrically formed in order to form the first crease parts and the second crease parts in the soft pneumatic module according to an example.

Figure 13:
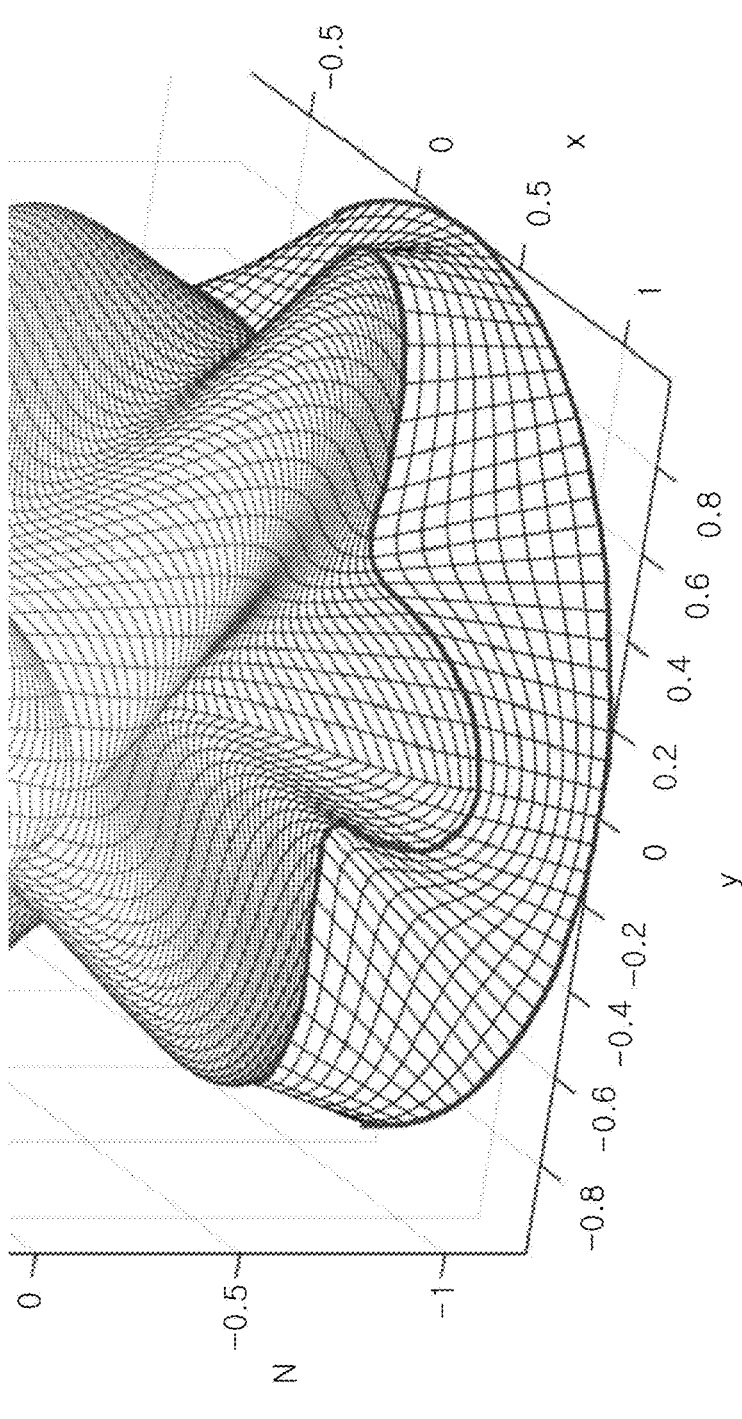

FIG. 13 is a view illustrating a state in which the curved surfaces of the first crease parts and the curved surfaces of the second crease parts are smoothly interpolated and connected in the soft pneumatic module according to an example.

Figure 14:
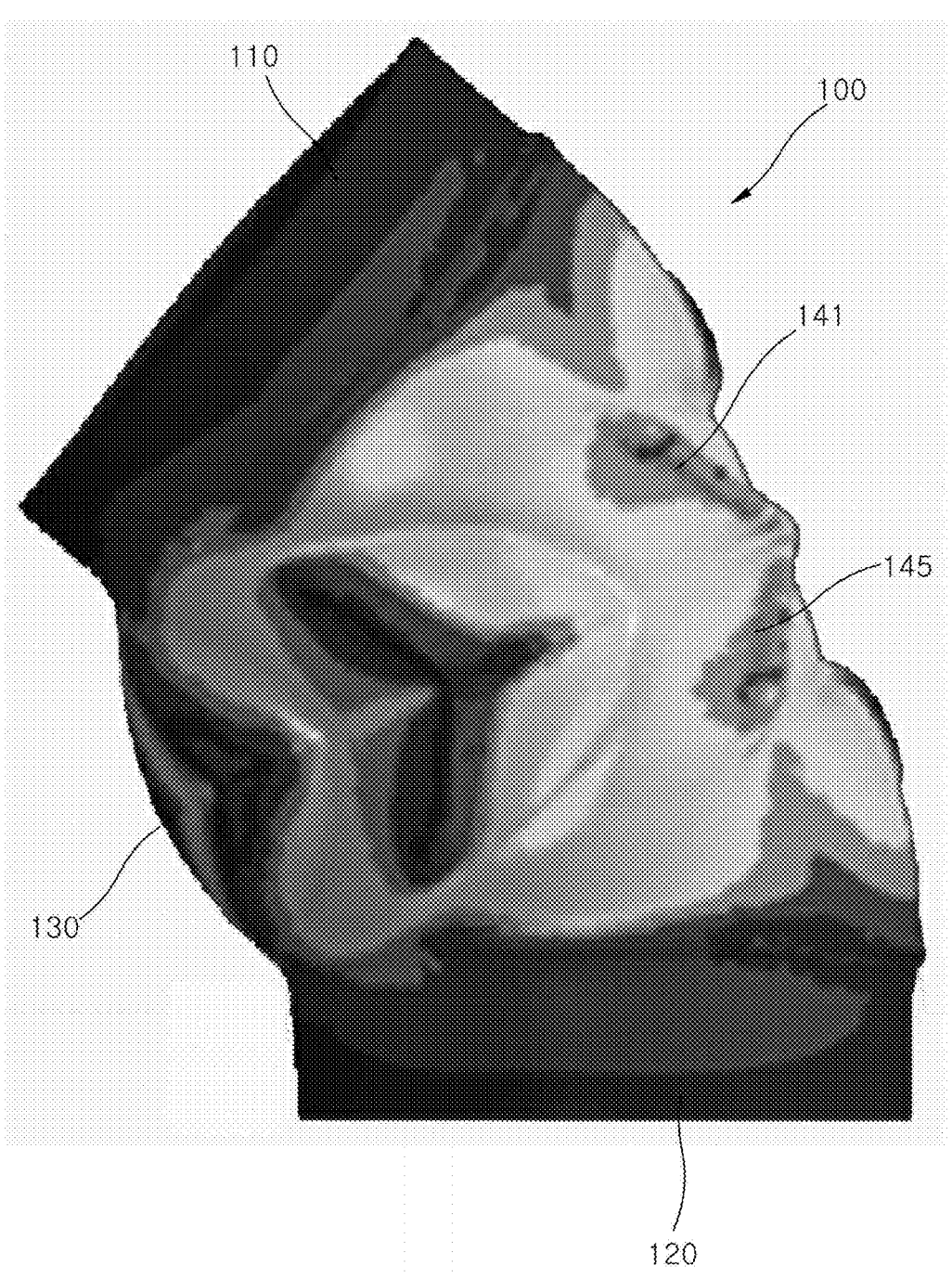

FIG. 14 is a view illustrating a state in which an amount of deformation of the soft pneumatic module is properly distributed among all the curved surfaces through a finite element analysis for the soft pneumatic module according to an example.

Figure 15:
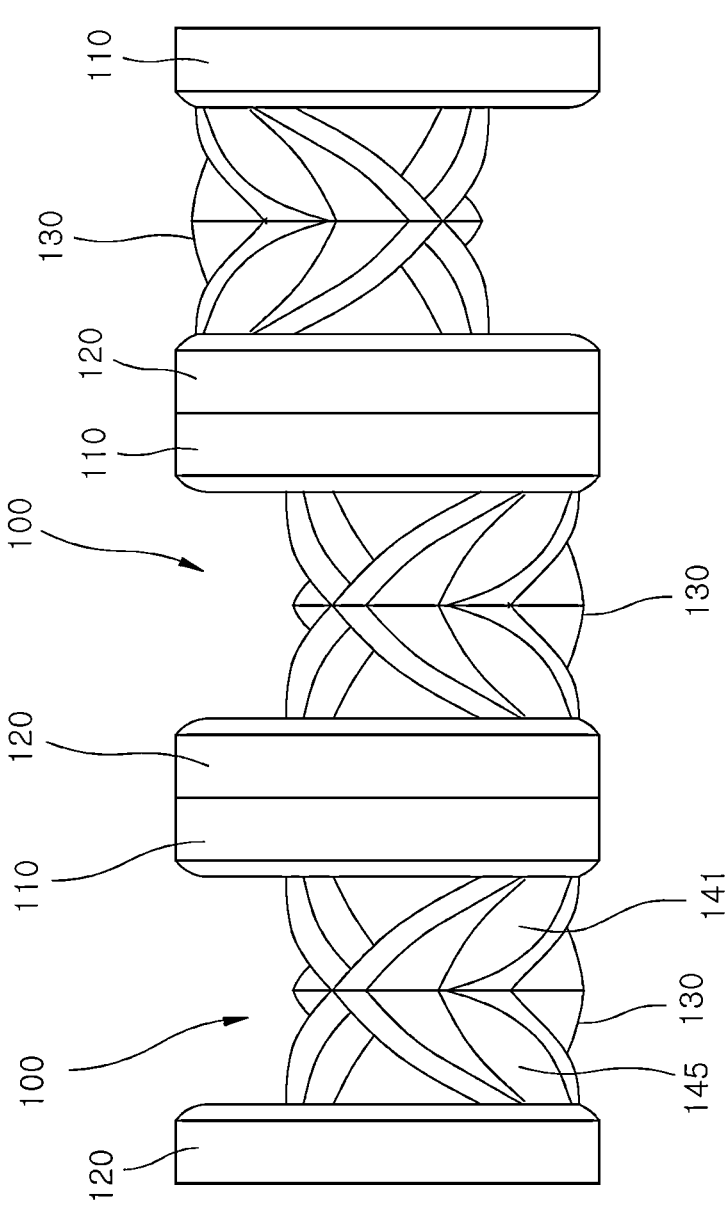

FIG. 15 is a perspective view illustrating a soft pneumatic gripper according to an example.

Figure 16:
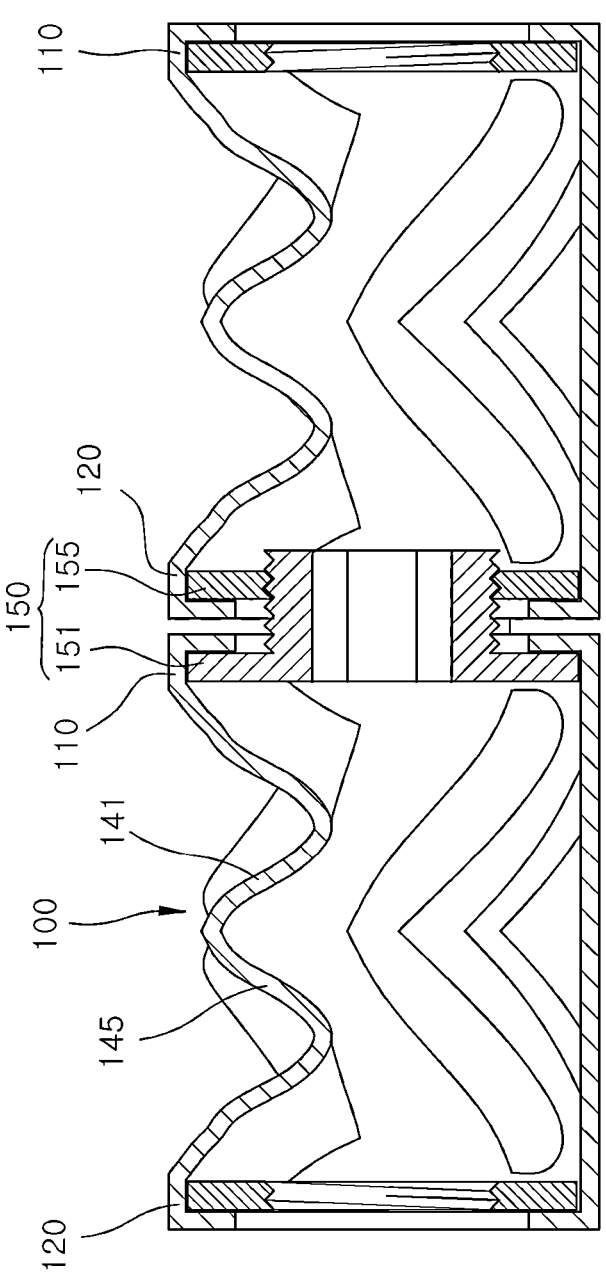

FIG. 16 is a cross-sectional view illustrating the soft pneumatic gripper according to an example.

Figure 17:
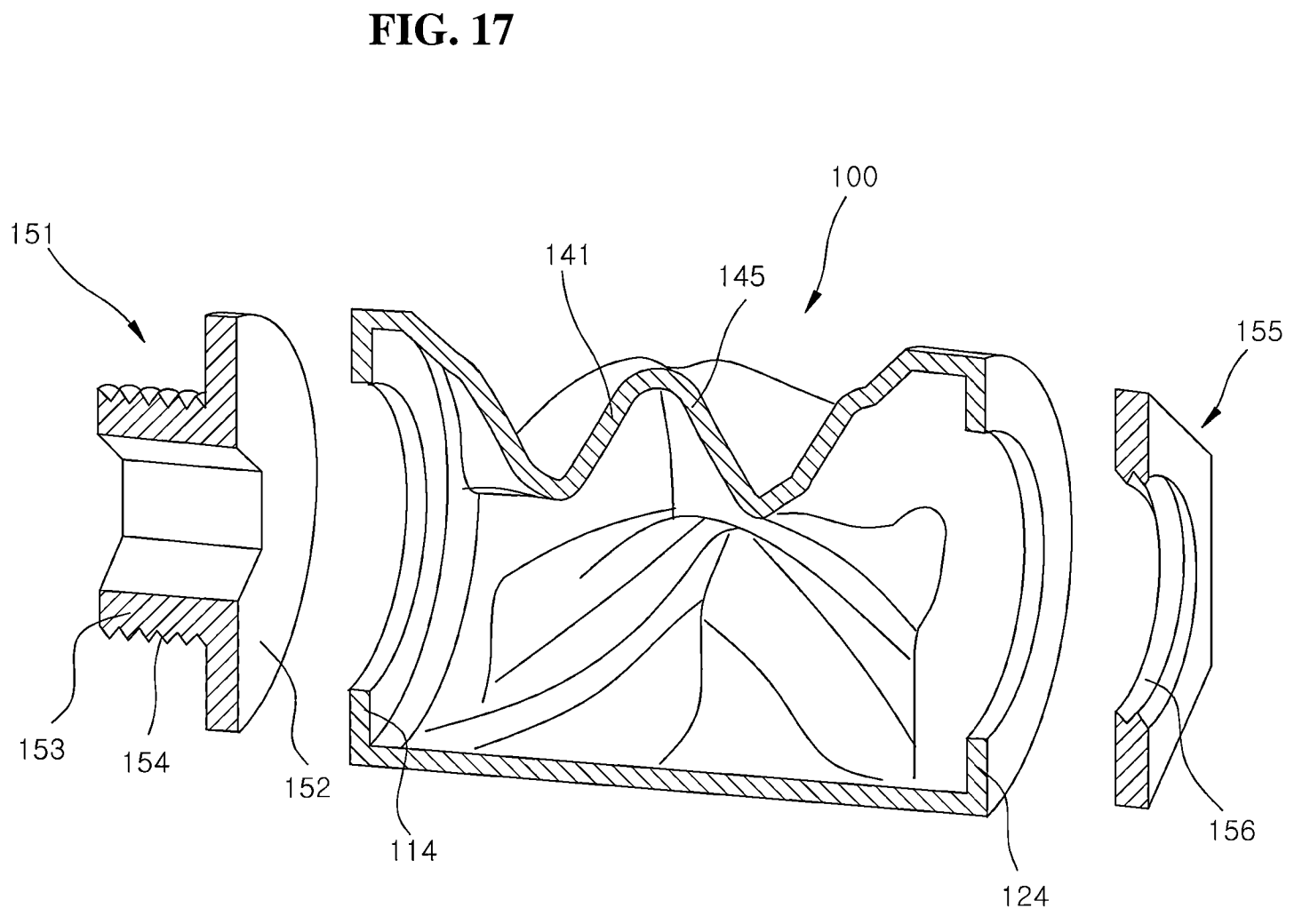

FIG. 17 is a schematic exploded view illustrating the soft pneumatic gripper according to an example.

Figure 18A:
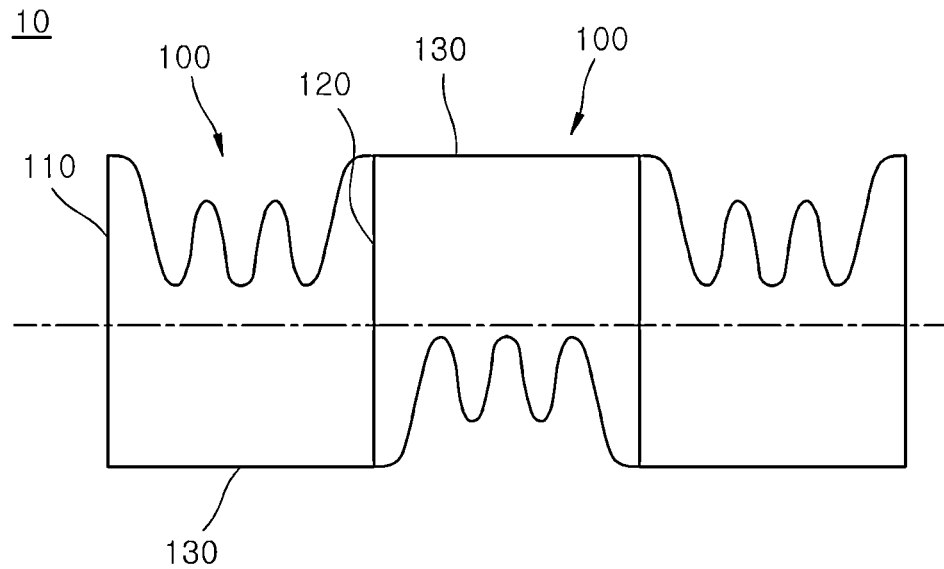
Figure 18B:
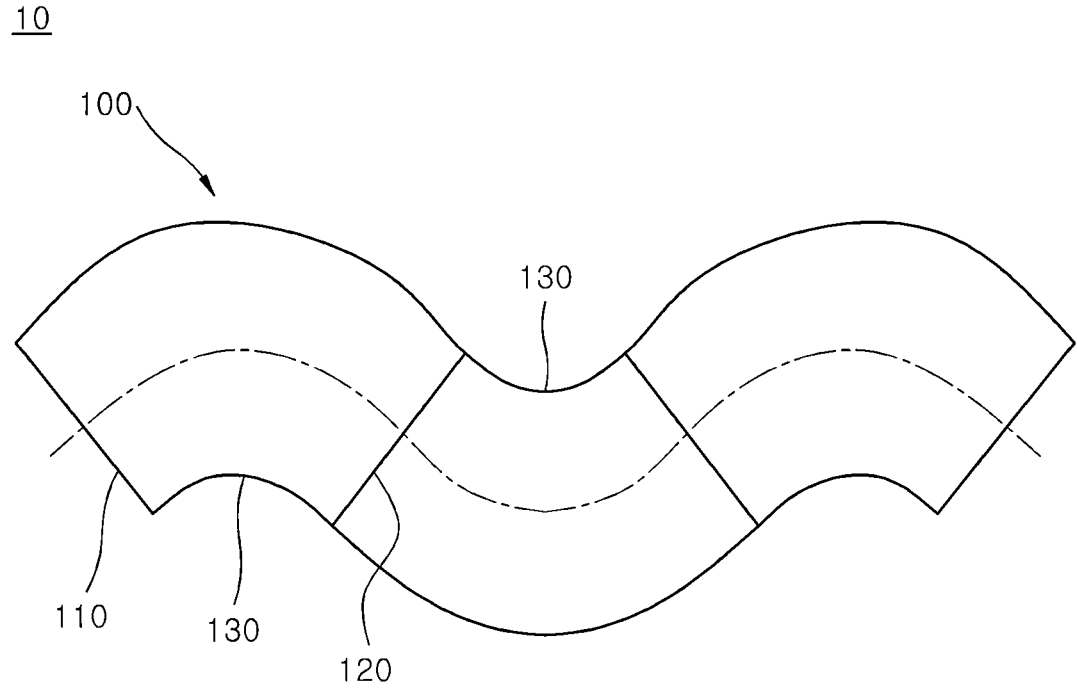

FIGS. 18A and 18B are a schematic view illustrating a state in which a bending deformation direction of the soft pneumatic gripper is changed by changing a position of the retainer in a circumferential direction in the soft pneumatic gripper according to an example.

Throughout the drawings and the detailed description, the same reference numerals refer to the same elements. The drawings may not be to scale, and the relative size, proportions, and depictions of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

The drawings may not be to scale, and the relative sizes, proportions, and depiction of elements in the drawings may be exaggerated for clarity, illustration, and convenience.

Figure 1:
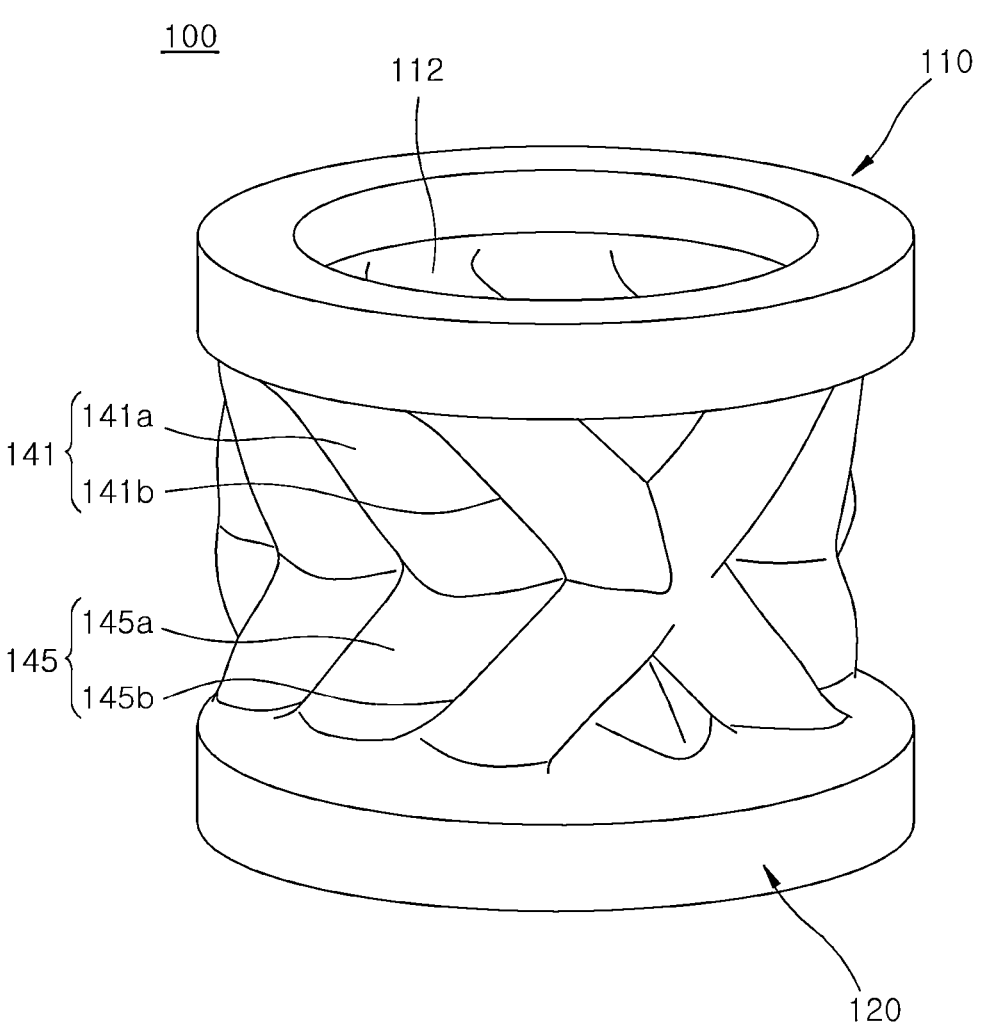
FIG. 1 is a perspective view illustrating a soft pneumatic module according to an example.

Hereinafter, various examples of a soft pneumatic module and a soft pneumatic gripper will be described with reference to the accompanying drawings. While the soft pneumatic module and the soft pneumatic gripper are described, thicknesses of lines, sizes of components, or the like in the drawings may be exaggerated for clarity and convenience of explanation. In addition, some terms described below are defined in consideration of functions in the invention, and meanings may vary depending on, for example, a user or operator's intentions or customs. Therefore, the meanings of terms should be interpreted based on the scope throughout this specification FIG. 1 is a perspective view illustrating a soft pneumatic module according to an example, FIG. 2 is a front view illustrating the soft pneumatic module according to an example, FIG. 3 is a side view illustrating the soft pneumatic module according to an example, FIG. 4 is a rear view illustrating the soft pneumatic module according to an example, FIG. 5 is a cross-sectional view illustrating the soft pneumatic module according to an example, FIG. 6 is a cross-sectional view illustrating a central portion of the soft pneumatic module cut in an axial direction according to an example, FIG. 7 is a side view illustrating a state in which the soft pneumatic module is bent and deformed when air is injected into the soft pneumatic module according to an example, and FIGS. 8A to 8C are a set of views illustrating an example of adjusting an amount of bending deformation of the soft pneumatic module by changing a position of a first crease part and a position of a second crease part which are spaced farthest from a retainer of the soft pneumatic module according to an example.

Referring to FIGS. 1 to 7, a soft pneumatic module 100 according to an example includes a first frame 110, a second frame 120, a retainer 130, a plurality of first crease parts 141, and a plurality of second crease parts 145.

The soft pneumatic module 100 may be applied to a soft pneumatic gripper 10 (see FIG. 16, for example) used for automation of sorting and transfer operations in the field of agriculture, the food industry, and the like. The soft pneumatic module 100 is formed of a flexible material such as a rubber or elastomer material. Accordingly, the soft pneumatic module 100 may prevent a product from being damaged when holding and restricting the product.

A first path portion 112 is formed inside the first frame 110. The first frame 110 is formed in a circular ring shape. The first frame 110 may be formed in a polygonal frame shape. A first restriction rib 114 is formed on the first frame 110. The first restriction rib 114 extends inward from the first frame 110 and is formed in a circular ring shape in a circumferential direction of the first frame 110.

The second frame 120 is opposite to the first frame 110, and a second path portion 122 is formed inside the second frame 120. The second frame 120 is formed in a circular ring shape. The second frame 120 may be formed in a polygonal frame shape. A second restriction rib 124 is formed on the second frame 120. The second restriction rib 124 extends inward from the second frame 120 and is formed in a circular ring shape in a circumferential direction of the second frame 120.

A size of the second frame 120 is the same or substantially the same as a size of the first frame 110. The first frame 110 and the second frame 120 are disposed at both end portions of the soft pneumatic module 100.

The retainer 130 is connected to the first frame 110 and the second frame 120. The retainer 130 is formed in a rectangular plate shape. When air is injected into the soft pneumatic module 100, the retainer 130 hardly expands.

The plurality of first crease parts 141 are disposed along a circumference of the first frame 110 at two sides of the retainer 130 and formed to be inclined inward from the first frame 110. The plurality of first crease parts 141 are disposed along the circumference of the first frame 110 with first convex parts 141a and first concave parts 141b alternately disposed.

The plurality of second crease parts 145 are connected to the plurality of first crease parts 141 and the second frame 120 and disposed along a circumference of the second frame 120 at two sides of the retainer 130, and when air is injected into the plurality of second crease parts 145, the plurality of second crease parts 145 expand along with the plurality of first crease parts 141. The plurality of second crease parts 145 are disposed along the circumference of the second frame 120 with second convex parts 145a and second concave parts 145b alternately disposed.

When air is injected into the soft pneumatic module 100, since the plurality of first crease parts 141 and the plurality of second crease parts 145 expand while spreading outward, even when a size of the soft pneumatic module 100 is small, large bending deformation may occur. Since the soft pneumatic module 100 is bent and deformed while spreading in a desired direction, systematic design specifications may be satisfied.

The first crease parts 141 and the second crease parts 145 are connected on a one-to-one basis. The first crease parts 141 and the second crease parts 145 connected on the one-to-one basis are formed at the same angle and with the same length. Accordingly, since the first crease parts 141 and the second crease parts 145, which are connected to each other, expand to the same length, the soft pneumatic module 100 may be prevented from expanding while being twisted.

As the plurality of first crease parts 141 and the plurality of second crease parts 145 are farther from the retainer 130, the plurality of first crease parts 141 and the plurality of second crease parts 145 converge inward from the first frame 110 and the second frame 120. Accordingly, since lengths of the first crease parts 141 and the second crease parts 145 increase as the first crease parts 141 and the second crease parts 145 are positioned farther from the retainer 130, when the soft pneumatic module 100 expands, the first frame 110 and the second frame 120 may be obliquely separated because the retainer 130 hardly expands and the lengths of the first crease parts 141 and the second crease parts 145 increase away from the retainer 130.

The plurality of first crease parts 141 and the plurality of second crease parts 145 are formed to be inclined toward an opposite side of the retainer 130. In this case, the lengths of the plurality of first crease parts 141 and the plurality of second crease parts 145 increase away from the retainer 130 (L11<L12<L13<L14<L15 and L21<L22<L23<L24<L25). Accordingly, expanding lengths of the first crease parts 141 and the second crease parts 145 may gradually increase away from the retainer 130. When air is injected into the soft pneumatic module 100, the soft pneumatic module 100 may be prevented from expanding while being twisted.

The first crease part 141 and the second crease part 145 positioned farthest from the retainer 130 (the outermost first crease part 141 and second crease part 145) are connected in a cross shape. Accordingly, the plurality of first crease parts 141 and the plurality of second crease parts 145 positioned at two sides of the retainer 130 may uniformly expand when the soft pneumatic module 100 expands.

FIGS. 8A to 8C are a set of views illustrating the example of adjusting the amount of bending deformation of the soft pneumatic module by changing the position of the first crease part and the position of the second crease part which are spaced farthest from the retainer of the soft pneumatic module according to an example.

Referring to FIGS. 8A to 8C, an amount of bending deformation of the soft pneumatic module 100 may be adjusted by changing positions of the first crease part 141 and the second crease part 145 which are positioned farthest from the retainer 130 in the soft pneumatic module 100. For example, when a size of the soft pneumatic module 100 is constant, as the outermost first crease part 141 and the outermost second crease part 145 are farther from the retainer 130, an amount of bending deformation of the soft pneumatic module 100 may decrease (H1>H2>H3). That is, the bending deformation of the soft pneumatic module 100 increases from FIG. 8A to FIG. 8C.

FIG. 9 is a view illustrating a state in which a pressure of a sinusoidal wave spreads from the first crease parts and the second crease parts in the soft pneumatic module according to one embodiment of the present invention.

Referring to FIG. 9, the first crease parts 141 and the second crease parts 145 of the soft pneumatic module 100 are formed so that sinusoidal waves spread in four directions based on a center, and angles between the directions are 90°.

FIG. 10 is a view illustrating a wall surface drawn using a cylindrical coordinate system in the soft pneumatic module according to an example.

Referring to FIG. 10, a wall surface of the soft pneumatic module 100 is drawn as a curved surface on the cylindrical coordinate system. A side at which a length is longest after the soft pneumatic module 100 is bent and deformed may be drawn as a point with an angle θ that is 0°, and a side at which a shortest length is maintained may be drawn as a point with an angle that is 180°. For continuous bending deformation, a length of a curve from the point with the angle of 0° to the point with the angle of 180° of the curved surface should have a shape decreasing in a monotonic manner (decreasing with no portion increasing therebetween).

FIGS. 11A and 11B are a set of views illustrating sine curves for forming the first crease parts and the second crease parts in the soft pneumatic module according to an example, FIGS. 12A and 12B are a set of views illustrating a state in which curved surfaces are symmetrically formed in order to form the first crease parts and the second crease parts in the soft pneumatic module according to an example, and FIG. 13 is a view illustrating a state in which the curved surfaces of the first crease parts and the curved surfaces of the second crease parts are smoothly interpolated and connected in the soft pneumatic module according to an example.

Referring to FIGS. 11A to 13, one-period sine curves corresponding to lengths of curves are drawn, and phases φ of the sine curves are drawn to increase proportional to an increase in an angle θ (see FIG. 11A). Curves at an angle of 0°<θ<180° are drawn in the same manner, and a curve finally drawn at an angle θ that is 180° should be a sine curve of which an amplitude is zero, that is, a straight line. The sine curves are continuously disposed in a circular manner in a direction of the angle θ based on an original point to form a curved surface (see FIG. 11B), and a curved surface is symmetrically drawn based on a side surface and a lower flat surface as illustrated in FIGS. 12A and 12B. In this case, upper and lower cross-sectional portions are set as circles with the same diameter to be connected to other soft pneumatic modules 100 and are smoothly interpolated and connected with calculated curved surfaces in advance (see FIG. 13).

FIG. 14 is a view illustrating a state in which an amount of deformation of the soft pneumatic module is properly distributed among all the curved surfaces through a finite element analysis for the soft pneumatic module according to an example.

Referring to FIG. 14, when air is injected into the soft pneumatic module 100 designed in the manner described above, a shape of deformation of the wall surface being distributed among all curved surfaces is shown. Accordingly, it can be seen that larger deformation may be induced in the same pressure condition. FIG. 14 shows that an amount of deformation of the soft pneumatic module 100 is properly distributed among all the curved surfaces through the finite element analysis.

Next, the soft pneumatic gripper according to an example.

FIG. 15 is a perspective view illustrating the soft pneumatic gripper according to an example, FIG. 16 is a cross-sectional view illustrating the soft pneumatic gripper according to an example, FIG. 17 is a schematic exploded view illustrating the soft pneumatic gripper according to an example, and FIGS. 18A and 18B are a schematic view illustrating a state in which a bending deformation direction of the soft pneumatic gripper is changed by changing a position of the retainer in a circumferential direction in the soft pneumatic gripper according to an example.

Referring to FIGS. 15 to 18, the soft pneumatic gripper 10 includes the soft pneumatic module 100 and a coupling module 150.

Two or more soft pneumatic modules 100 are connected in series. The coupling module 150 connects two sides of the soft pneumatic modules 100. The coupling module 150 presses two adjacent sides of the soft pneumatic modules 100 to seal a gap between the adjacent soft pneumatic modules 100.

Since the soft pneumatic module 100 is the same as that described above, description will be omitted, and the same numerals will be assigned thereto.

The coupling module 150 includes a first clamp 151 and a second clamp 155. The first clamp 151 passes through the first frame 110 and the second frame 120, which are adjacent thereto, and restricts the first frame 110. The first restriction rib 114 of the first frame 110 is pressed. The second clamp 155 is coupled to the first clamp 151 to restrict the second frame 120. The second clamp 155 presses the second restriction rib 124 of the second frame 120. When the first clamp 151 and the second clamp 155 are coupled, since the first clamp 151 and the second clamp 155 compress the first restriction rib 114 and the second restriction rib 124, air leaking through the first frame 110 and the second frame 120 can be prevented.

The first clamp 151 includes a first pressure ring part 152 which presses the first frame 110 and a first coupling pipe part 153 which is connected to the first pressure ring part 152 to pass through the first frame 110 and the second frame 120 and on which a first screw part 154 is formed to be coupled to the second clamp 155. The first pressure ring part 152 is formed in an annular shape to compress the first restriction rib 114. A communication hole part (not shown) through which the soft pneumatic modules 100 at two sides communicate with each other is formed in the first coupling pipe part 153. The first screw part 154 is formed on an outer surface of the first coupling pipe part 153.

The entirety of the second clamp 155 is formed in an annular shape. A second screw part 156 to which the first screw part 154 is screw-coupled is formed inside the second clamp 155.

When the soft pneumatic modules 100 are connected in series, a bending deformation direction of the soft pneumatic gripper 10 may be changed by changing positions of the retainers 130 in the circumferential direction.

For example, when the soft pneumatic modules 100 are connected in series, and the retainers 130 are positioned on one straight line in a longitudinal direction of the soft pneumatic modules 100, since all of the soft pneumatic modules 100 are deformed in the same direction, the soft pneumatic gripper 10 is bent and deformed in an arc shape. When the soft pneumatic modules 100 are connected in series, and adjacent retainers 130 are disposed at opposite sides (positions twisted 180° from each other, see FIG. 19), since the odd-numbered soft pneumatic module 100 is deformed to one side and the even-numbered soft pneumatic module 100 is deformed to the other side, the soft pneumatic gripper 10 is bent and deformed in a zigzag manner. In addition, when the soft pneumatic modules 100 are connected in series, and the adjacent retainers 130 are disposed to be twisted by a predetermined angle in the circumferential direction, the soft pneumatic gripper 10 may be bent and deformed in a spirally twisted shape.

Accordingly, the soft pneumatic gripper 10 may be manufactured for products having various sizes and shapes. In addition, the soft pneumatic gripper 10 may be bent and deformed in a desired direction, and a separate deformation restriction element does not need to be installed.

According to the various examples, when air is injected into a soft pneumatic module, since a plurality of first crease parts and a plurality of second crease parts expand while spreading outward, although a size of the soft pneumatic module is small, large bending deformation can occur.

According to the various examples, since the plurality of first crease parts and the plurality of second crease parts expand while spreading outward, the soft pneumatic module can be prevented from being bent and deformed while being twisted. Accordingly, the soft pneumatic module can be bent and deformed in a desired direction.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A soft pneumatic module comprising:
a first frame defining a first path portion;
a second frame opposite to the first frame and defining a second path portion;
a retainer connected to the first frame and the second frame;
a plurality of first crease parts disposed along a circumference of the first frame at two sides of the retainer and obliquely disposed inward from the first frame; and
a plurality of second crease parts connected to the plurality of first crease parts and the second frame, disposed along a circumference of the second frame at the two sides of the retainer, and configured to expand along with the plurality of first crease parts as a fluid is injected into the soft pneumatic module,
wherein, as a distance from the retainer increases, a length of each of the first crease parts and a length of each of the second crease parts increase, and
wherein a first crease part, from among the plurality of first crease parts, disposed farthest from the retainer and a second crease part, from among the plurality of second crease parts, disposed farthest from the retainer are connected to each other in a cross shape.

2. The soft pneumatic module of claim 1, wherein each of the first crease parts is connected to a respective one of the second crease parts in a one-to-one manner.

3. The soft pneumatic module of claim 2, wherein each of the first crease parts and the second crease parts converge inward toward the retainer from the first frame and the second frame.

4. The soft pneumatic module of claim 2, wherein the first crease parts and the second crease parts are obliquely disposed in an opposite direction of the retainer.

5. A soft pneumatic gripper comprising:
two or more soft pneumatic modules connected in series; and
a coupling module that couples two sides of the soft pneumatic modules,
wherein each of the soft pneumatic modules comprises:
a first frame defining a first path portion,
a second frame opposite to the first frame and defining a second path portion,
a retainer connected to the first frame and the second frame,
a plurality of first crease parts disposed along a circumference of the first frame at two sides of the retainer and obliquely disposed inward from the first frame, and
a plurality of second crease parts connected to the plurality of first crease parts and the second frame, disposed along a circumference of the second frame at the two sides of the retainer, and configured to expand along with the plurality of first crease parts as a fluid is injected into the soft pneumatic module, and
the coupling module comprises:
a first clamp that passes through an adjacent first frame and an adjacent second frame and restricts the first frame, and a second clamp coupled to the first clamp to restrict the second frame.

6. The soft pneumatic gripper of claim 5, wherein the first clamp comprises:

a first pressure ring part pressing the first frame; and a first coupling pipe part connected to the first pressure ring part to pass through the first frame and the second frame and on which a first screw part is disposed to be screw-coupled to the second clamp.

7. The soft pneumatic gripper of claim 5, wherein, when the soft pneumatic modules are connected in series, bending deformation directions of the soft pneumatic modules are changed by changing positions of the respective retainers in a circumferential direction.

8. The soft pneumatic gripper of claim 5, wherein, for each of the soft pneumatic modules, each of the first crease parts is connected to a respective one of the second crease parts in a one-to-one manner.

9. The soft pneumatic gripper of claim 8, wherein, for each of the soft pneumatic modules, each of the first crease parts and the second crease parts converge inward toward the retainer from the first frame and the second frame.

10. The soft pneumatic gripper of claim 8, wherein, for each of the soft pneumatic modules, the first crease parts and the second crease parts are obliquely disposed in an opposite direction of the retainer.

11. The soft pneumatic gripper of claim 10, wherein, for each of the soft pneumatic modules, as a distance from the retainer increases, a length of each of the first crease parts and a length of each of the second crease parts increase.

12. The soft pneumatic gripper of claim 11, wherein, for each of the soft pneumatic modules, a first crease part disposed farthest from the retainer and a second crease part disposed farthest from the retainer are connected to each other in a cross shape.

* * * * *